United States Patent
Pannwitz

(10) Patent No.: US 6,804,098 B2
(45) Date of Patent: Oct. 12, 2004

(54) CHARGE/DISCHARGE PROTECTION CIRCUIT FOR A RECHARGEABLE BATTERY

(75) Inventor: Axel Pannwitz, Lennigen (DE)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 0 days.

(21) Appl. No.: 10/346,381

(22) Filed: Jan. 17, 2003

(65) Prior Publication Data

US 2004/0021440 A1 Feb. 5, 2004

(30) Foreign Application Priority Data

Jan. 31, 2002 (DE) .......................................... 102 03 909

(51) Int. Cl.[7] .............................. H02H 3/20; H02J 7/00
(52) U.S. Cl. .......................... 361/90; 361/56; 320/100; 320/134; 307/10.7
(58) Field of Search .......................... 361/90, 93.1, 56, 361/57, 103; 320/100, 134, 136, 149, 133, 152; 307/10.7, 141, 150

(56) References Cited

U.S. PATENT DOCUMENTS

| | | | | |
|---|---|---|---|---|
| 5,343,137 A | * | 8/1994 | Kitaoka et al. | ............. 320/132 |
| 5,510,659 A | * | 4/1996 | Lewis et al. | .................... 307/11 |
| 5,703,463 A | * | 12/1997 | Smith | ........................... 320/134 |
| 6,687,103 B2 | * | 2/2004 | Pannwitz | ...................... 361/90 |
| 6,710,992 B2 | * | 3/2004 | Pannwitz et al. | ............. 361/90 |

OTHER PUBLICATIONS

U.S. patent application Ser. No. 10/057,490, filed on Jan. 24, 2002, DS–01–036, "Charge/Discharge Protection Circuit for a Rechargeable Battery".

* cited by examiner

*Primary Examiner*—Rajnikant B. Patel
(74) *Attorney, Agent, or Firm*—George O. Saile; Stephen B. Ackerman

(57) ABSTRACT

The invention refers to a charge/discharge protection circuit for a rechargeable battery being able to differentiate between a temporary overvoltage on the charge/discharge terminals and a permanent overvoltage and in the last case for security reasons to permanently disconnect the battery from the charge/discharge terminals. Hereby said protection circuit comprises a number of partial switches (15[1:]), being either parallel to a load switch (LS) or parallel to the charge terminals, and an overvoltage detector (10) which closes in case of an overvoltage all partial switches via a control logic (11, 12, 13, 17, 18) and which afterwards opens one partial switch after the other. A voltage detector (16), monitoring the remaining voltage over the partial switches, inhibits, however, the opening of at that time next partial switch if the remaining voltage over the still closed partial switches is higher than a predefined limit of said remaining voltage. In case the cycle is not completed within a predefined time interval, that means that after the time interval at least the last partial switch is still closed, the control circuit activates a permanent disconnection of the battery from charge terminals.

12 Claims, 3 Drawing Sheets

CHARGE/DISCHARGE PROTECTION CIRCUIT FOR A RECHARGEABLE BATTERY

RELATED PATENT APPLICATION

This application is related to U.S. patent application Ser. No. 10/057,490 filed on Jan. 24, 2002.

BACKGROUND OF THE INVENTION

(1) Field of the Invention

The invention relates to a charge/discharge protection circuit for a rechargeable battery, and more particularly, to a circuit which is protected by a fuse, comprising a control circuit which opens or closes a load switch depending on the magnitude of the battery voltage, the voltage on the charge/discharge terminals of said protection circuit and the charge/discharge current.

(2) Description of the Prior Art

Charge/discharge protection circuits are particularly used in so called battery packs for mobile phones and monitor inter alia the maximum/minimum voltages of charging/discharging of said battery and the maximum allowable charge/discharge currents. In case of exceeding said limits said load switch is opened. One example of such a protection circuit is the U.S. application Ser. No. 10/057,490, filed on Jan. 24, 2002, herein incorporated by reference. Said protection circuit of U.S. application Ser. No. 10/057,490 can particularly be positioned between a single Lithium-Ion cell and the circuitry of a mobile phone.

All manufacturers of mobile phones offer battery chargers specific to their mobile phones and to the battery packs of said mobile phones. Nevertheless there are sometimes attempts to charge a battery using a battery charger produced by a different manufacturer. Subject of U.S. application Ser. No. 10/057,490 is a protection circuit which detects, inter alia, a charging voltage being too high produced e.g. by a defective battery charger or by a battery charger from a different manufacturer and reliably disconnects the battery to avoid a dangerous overcharging prior to a destruction of said protection circuit by said overvoltage. The protection circuit of said patent application admittedly can not differentiate between the occurrence of a short-time overvoltage and of a long-time overvoltage, thus it also disconnects the battery permanently from the charge/discharge terminals and as the case may be will be destructed even if said overvoltage is merely caused by a capacitor of a battery charger charged to an increased open circuit voltage.

SUMMARY OF THE INVENTION

The objective of the invention is to achieve a charge/discharge protection circuit of the above-described type but being able to differentiate between the occurrences of a short-time overvoltage on the charge/discharge terminals and between a long-time occurring overvoltage. In the first case the overvoltage has to be shunted reliably, in the second case the battery has to be disconnected permanently.

In accordance with the objects of this invention a charge/discharge protection circuit for a rechargeable battery has been achieved. Said circuit, secured by a fuse, is comprising a control circuit, which opens or closes a load switch, dependent on the magnitude of the voltage on the battery terminals, the voltage on the charge/discharge terminals of said protection circuit and on the magnitude of the charge/discharge current. Said circuit is characterized that a number of partial switches is located parallel to the load switch, that an overvoltage detector closes, in case of an overvoltage on charge/discharge terminals, all partial switches via a control logic, which afterwards cyclically progressing opens one partial switch after the other, and that a voltage detector, monitoring the remaining voltage over the partial switches inhibits the opening of at that time next partial switch if the remaining voltage over the still closed partial switches is higher than a predefined limit of said remaining voltage. Furthermore said circuit is characterized that the control logic activates a permanent disconnection of the battery from the charge/discharge terminals if the cycle is not completed within a predefined time Interval, that means, if at least the last partial switch is still closed.

Also in accordance with the objects of this invention a charge/discharge protection circuit for a rechargeable battery has been achieved. Said circuit, secured by a fuse, comprises a control circuit, which opens or closes a load switch, dependent on the magnitude of the voltage on the battery terminals, the voltage on the charge/discharge terminals of said protection circuit and on the magnitude of the charge/discharge current. Said circuit is characterized that an arrangement of short-circuit switches comprising parallel arranged partial switches is located parallel to the charge/discharge terminals, that an overvoltage detector closes, in case of an overvoltage on charge/discharge terminals, all partial switches via a control logic, which afterwards cyclically progressing opens one partial switch after the other, and that a voltage detector, monitoring the remaining voltage over the partial switches inhibits the opening of at that time next partial switch if the remaining voltage over the still closed partial switches is higher than a predefined limit of said remaining voltage. Furthermore said control logic activates a permanent disconnection of the battery from the charge/discharge terminals if the cycle is not completed within a predefined time interval, that means if at least the last partial switch is still closed.

BRIEF DESCRIPTION OF THE DRAWINGS

In the accompanying drawings forming a material part of this description, there is shown.

DESCRIPTION OF THE PREFERRED EMBODIMENTS

Figure 1:
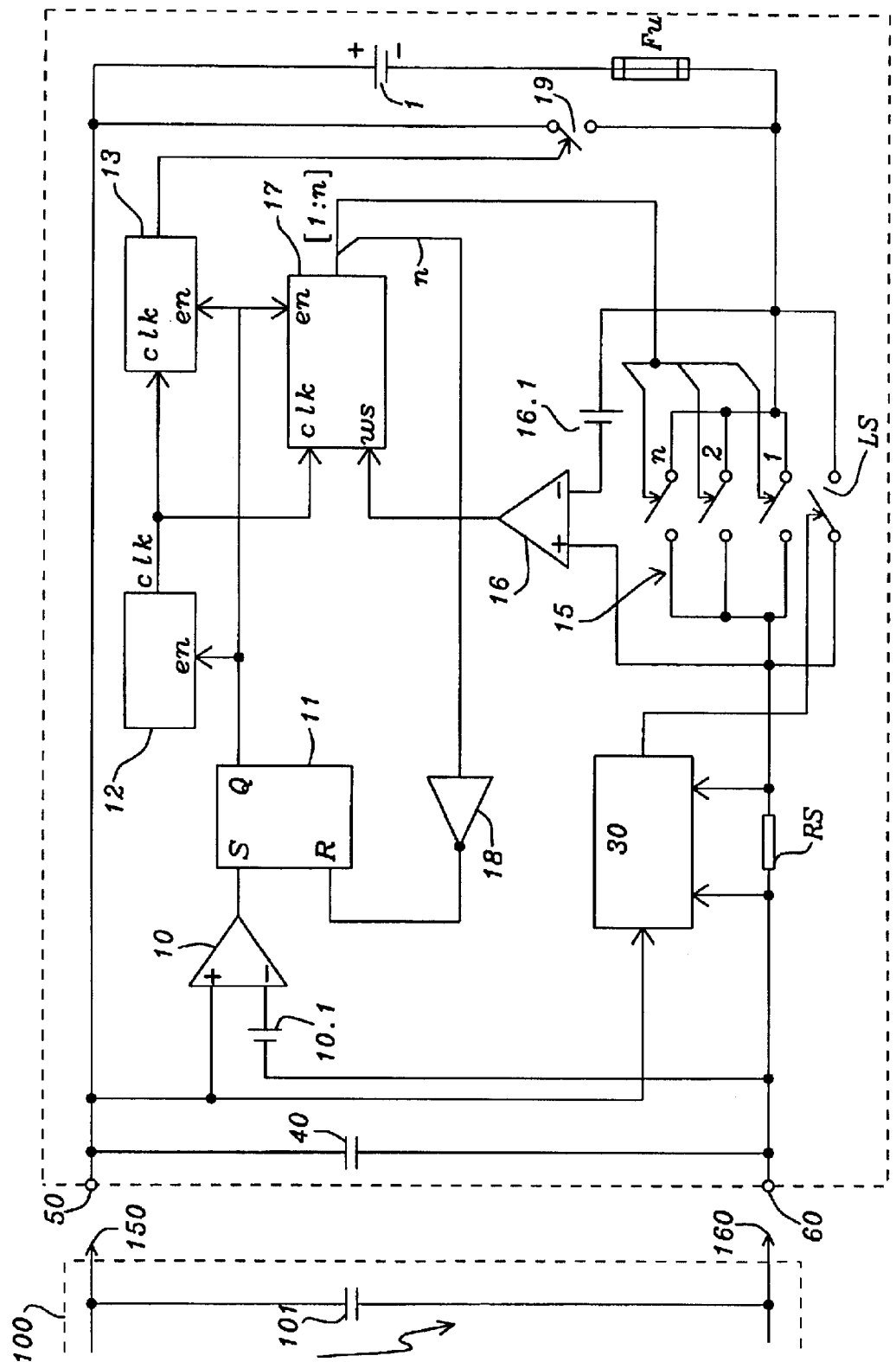
FIG. 1 shows a first embodiment having an overvoltage short-circuited via the battery.

Using a charge/discharge protection circuit for a rechargeable battery protection circuit a first embodiment comprises to deploy a number of partial switches parallel to said load switch, in case of overvoltage on the charge/discharge terminals an overvoltage detector closes all said partial switches via a control logic which subsequently opens cyclically progressing one partial switch after the other, a voltage detector monitoring the remaining voltage over said partial switches inhibits the opening of at that time next partial switch, if the remaining voltage over the still closed partial switches is higher than a predefined limit of said remaining voltage, and said control logic activates a permanent disconnection of the battery from the charge/discharge terminals if the cycle is not totally completed within a predefined time interval, that means at least the last partial switch is still closed.

A second embodiment comprises to deploy an arrangement of short-circuit parallel partial switches parallel to said charge/discharge terminals, a overvoltage detector to close all said partial switches in case of an overvoltage on the charge/discharge terminals via a control logic which afterwards opens cyclically progressing one partial switch after the other in a way that a voltage detector monitoring the remaining voltage over said partial switches inhibits the opening of at that time next partial switch, if the remaining voltage over the still closed partial switches is higher than a predefined limit of said remaining voltage, and said control logic to activate a permanent disconnection of the battery from the charge/discharge terminals if the cycle is not totally completed within a predefined time interval, that means at least the last partial switch is still closed.

Both embodiments have the same common fundamental idea to short-circuit a temporary overvoltage via a low-ohmic current path which is in the first solution via the battery and in the second solution via a short-circuit arrangement of partial switches. Furthermore to check, periodically in a fast succession correlative to the decreasing number still closed partial switches and thereby to an increasing passing resistance of said switches, if said short-circuit current disappears and only, if this doesn't happen within a predefined time, to disconnect the battery, due to safety reasons, permanently and finally from the charge/discharge terminals; otherwise, however, the continuation of the normal function of the charge/discharge protection circuit is accepted. Thereby the deployment of multiple parallel partial switches has also the purpose to create at first such a low-ohmic current path, that even a high short-circuit current, caused e.g. by a charged capacitor, causes no unduly high voltage on the terminals of the protection circuit, thereby putting the function of said protection circuit at risk.

Preferably said control logic for a permanently disconnection of the battery comprises a controlled switch, connected via a fuse to one of the terminals of said battery. Said switch, which is closed by said control logic if within a predefined time interval at least still the last partial switch is closed. Thereby the battery provides a short-circuit current deleting the fuse.

In order to implement said time criterion said control logic may comprise a timing circuit whose delay time is longer than the predefined time interval for the cyclical opening of all partial switches and which after said delay time generates a signal to activate a permanent disconnection of the battery, that means particularly the signal closing the above mentioned switch connecting the battery with the said fuse.

In order to ensure that the protection circuit invented returns to its initial position after detection of an overvoltage even then if said overvoltage disappears soon, e.g. because being generated by a capacitor having a small capacity, the control logic can comprise a R/S-flipflop to store the event of a detected overvoltage wherein the exit of said R/S-flipflop is connected to the release entry points of the timing circuit and of a switch-logic which is receiving a clock signal and is generating cyclically progressing the control signals to open one partial switch after the other as long as on another entry point of said switch-logic the exit signal of the voltage detector is activated. Said exit signal corresponds to the event that the remaining voltage over the still closed partial switches is higher than the predefined limit of the remaining voltage.

Purposely said R/S-flipflop receives on its reset entry point at this point of time a reset signal derived from the control pulse for the last partial switch.

An enhancement of said protection circuit detects if after a battery charger has been connected which provides a short-time overvoltage and, within a predefined time interval, provides again a (short-time or a permanent) overvoltage caused by e.g. a defective battery charger. Said embodiment is characterized by having the exit of the overvoltage detector connected to a first entry point of an AND-element whose second entry point is connected to the exit of a memory circuit whose entry is likewise connected to the exit of said overvoltage detector. Said memory circuit sets the second entry of said AND-element on a "1" after the first event of an overvoltage during a predefined time interval which is longer than the cycle time, thus causing that the next event of an overvoltage, happening in said predefined time interval generates a "1" on the exit of said AND-element and therefore activates a permanent disconnection of the battery.

Figure 2:
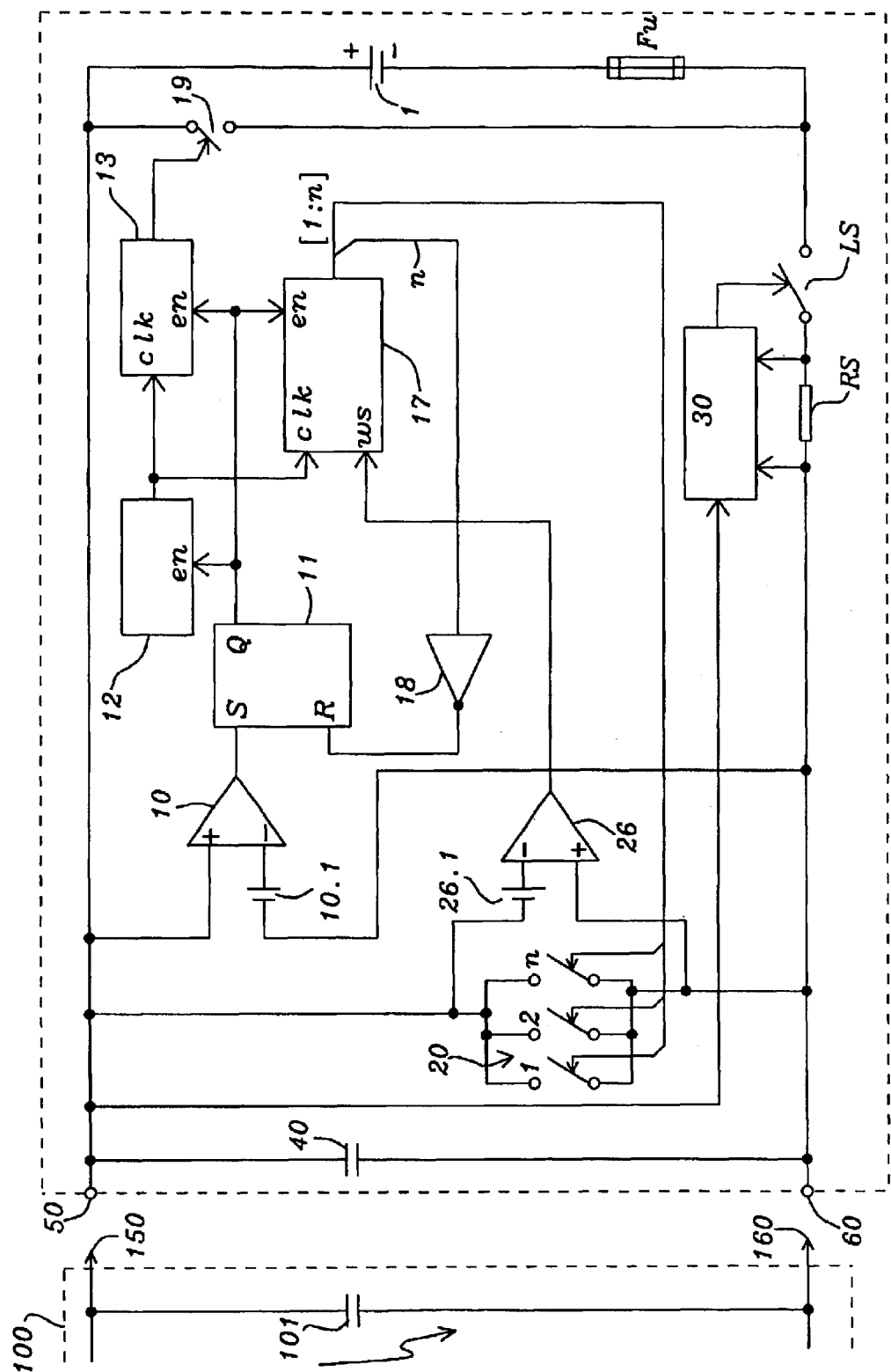
FIG. 2 shows a second embodiment having an overvoltage short-circuited via an arrangement of short circuit switches.

The protection circuit shown in FIG. 1 and FIG. 2 is located as an integrated circuit between the terminals of a Lithium-ion cell 1 and two charge/discharge terminals 50 and 60 having in parallel for protection against a fast voltage rises a filter capacitor 40. An only adumbrated battery charger 100 with its terminals 150 and 160 can be connected to charge the Lithium-Ion cell 1 via the charge/discharge terminals 50 and 60. A control circuit 30 monitors, in a well-known way, the maximum/minimum voltages of the charge/discharge of the LI-Ion cell 1 and via a shunt resistor RS the maximum allowable charge/discharge current and opens in case of excessive magnitudes the load switch LS. The control circuit 30 closes said load switch LS if the LI-Ion cell 1 is at least partially discharged. In case the battery charger 100 operates correctly an acceptable charge current is flowing, after the battery charger is connected, via the shunt resistor RS, the load switch LS and a fuse FU into the LI-Ion cell 1 until the maximum charge voltage is reached and therefore the control circuit 30 opens the load switch LS.

Most battery chargers comprise on the exit side a capacitor for filtering and/or smoothing purposes as adumbrated by capacitor 101. Said capacitor may be charged to a open circuit voltage exceeding the allowable maximum limit on terminals 50 and 60; it may also happen that the battery charger 100 provides on its terminals 150 and 160 a too high voltage because, e.g., said battery charger is defective or, e.g., said battery charger, being from another manufacturer or being another type, is not designed for a LI-Ion cell 1 but for a rechargeable battery having multiple cells. Under all circumstances it has to be ensured that, using rechargeable batteries, especially the kind used in mobile phones and, above all, Li-Ion cells, that the total circuitry, especially the control circuit 30, is malfunctioning due to an overvoltage. Otherwise the current source would be overloaded, in the worst case until an explosion.

Hereunto the protection circuit invented comprises, additional to the known control circuit 30, in the embodiment of FIG. 1 the following components:

Parallel to the load switch LS are multiple controllable partial switches [1:n] 15. The common terminals of this arrangement are connected to the entry points of a remaining voltage detector comprising a voltage comparator 16 and a reference voltage source 16.1, providing a voltage in the order of magnitude of about 30 mV. Said voltage comparator 16 generates on its exit a logical signal "1", as long as the voltage over the closed partial switches [1:n] 15 is smaller than a predefined remaining voltage limit. The exit of the voltage comparator 16 is connected to a continuous switching entry point "WS" of a switching logic 17. Said switching logic controls separately via separate exits (1:n) the partial switches [1:n] 15. Additionally the exit n of the switching logic 17 is connected to the reset entry point R of a R/S flipflop 11 via an inverter 18. Therefore, as long as said exit n has the logical value "0", the logical value "1" is on said reset entry point R of the R/S flipflop 11. The set entry point S of said R/S flipflop 11 is connected to the exit of an overvoltage detector comprising a comparator 10 which compares the voltage on the charge/discharge terminals 50 and 60 with the voltage of a reference voltage source 10.1 and generates on its exit the logical signal "1" in case of an overvoltage. The R/S flipflop 11 is designed in a way that its set entry point S dominates. In case a logical signal "1" is on the entry point S of said flipflop 11, a logical value "1" is subsequently on the exit point Q of said flipflop 11. This signal is received by the release entry points "en" of a clock generator 12, by a timer or timing circuit 13, and by the switching logic 17. The exit of said timing circuit 13 is connected to the control entry point of a semiconductor switch 19 that connects the terminals of the Li-Ion cell 1 via the fuse Fu. Said semiconductor switch 19 is normally in an open state.

As long as a signal "1" is on the release entry point "en" of the clock generator 12 said clock generator 12 provides clock pulses with a frequency of e.g. 1 kHz as well to a clock entry point "clk" of the timing circuit 13 as to a clock entry point "clk" of switching logic 17. The timing circuit 13, which is in said embodiment a down counter, but could be as well a mono-flop (and hence does not require clock pulses) generates on its exit after a delay time, which could be in the order of magnitude between some hundred milliseconds until a few seconds, a logical signal "1" which closes the switch 19.

In case of an overvoltage on the charge/discharge terminals 50 and 60, by reasons whatsoever, this protection circuit works as follows:

The overvoltage detector 10, 10.1 sets the exit Q of the R/S flipflop 11 to "1". The switching logic 17 receives said signal "1" on its entry "en". Hereupon the switching logic 17 sets all its exits [1:n] also on the logical value "1" and consequently all partial switches [1:n] 15 close immediately. Before the partial switches 15 close they are exposed to the overvoltage minus the battery voltage so that the remaining voltage detector 16, 16.1 provides the exit signal "0" to the entry "WS" of the switching logic 17, whereby said switching logic remains in its momentary state.

Between the charge/discharge terminals 50, 60 exists a low-ohmic current path as soon as all partial switches 15 are closed. In case the overvoltage has been caused by a charged capacitor the well-known decreasing compensating capacitor current emerges. In case a wrong or defective battery charger has caused the overvoltage the current produced is basically constant. The protection circuit invented permits a secure differentiation between said both cases. The total resistance of the parallel arrangement of the passing resistance of said closed partial switches [1:n] 15 is so low that the overvoltage on the charge/discharge terminals 50 and 60 breaks down in all conceivable cases of the practice, that means at least drops to a magnitude being lower than the maximal allowable limit of the voltage on the charge/discharge terminals 50 and 60.

Dependent on the magnitude of the current, caused by a overvoltage, through the closed partial switches [1:n] 15, said partial switches are exposed to a voltage being proportional to their passing resistance. Said voltage may be higher or lower as the switching threshold of the remaining voltage detector 16, 16.1 which amounts to about 30 mV. In case said voltage is higher than said switching threshold the remaining voltage detector generates the signal "0" to the continuous switching entry point WS of switching logic 17 causing said switching logic 17 to remain in its switching state "all partial switches closed". In case said voltage is lower or gets lower, by a reduction of the overvoltage, than said threshold voltage, the remaining voltage detector generates a logical signal "1" to the continuous switching entry point WS of switching logic 17 causing said switching logic 17, according to the clock pulses delivered by the clock generator 12 to the entry "clk" of said switching logic 17, to set its exits [1:n] one after the other from "1" to "0" and therewith sequentially opens the correspondent partial switches 15.1, 15.2 . . . , 15.n.

Accordingly the passing resistance of the arrangement of the partial switches is increasing stepwise. Therewith the sensitivity of the protection circuit increases for the compensation current caused by an overvoltage. In case the current flowing through the partial switch arrangement 15 is still so high, that the remaining voltage over the stepwise increased passing resistance of the partial switch arrangement is higher than the switching threshold of the remaining voltage detector 16 and 16.1 then its exit signal "ws" changes from "1" to "0" and therefore inhibits the continuous switching of the switching logic 17 and consequently no additional partial switch is opened anymore.

In the meantime timing circuit 13 continues to run. In case, after its delay time has expired and, at this point of time, at least still the last partial switch 15.n is closed, timing circuit 13 generates on its exit the above mentioned control signal which is closing switch 19 with the consequence that fuse Fu will be deleted immediately by the resulting short-circuit current and therewith the LI-Ion cell 1 will be permanently disconnected.

Whereas, if during the delay time of the timing circuit 13 the overvoltage disintegrates, the switching logic 17 opens also the last partial switch 15.n by setting also its exit "n" to "0". Said exit is, as already described above, additionally connected to the reset entry "R" of the R/S flipflop 11 via the inverter 18. Therefore the exit Q of said flipflop 11 goes to "0", locks therewith clock generator 12 and resets timer circuit 13 as well as switching logic 17 back to the initial position.

Thereafter control circuit 30 takes over its normal control of load switch LS as described in the introduction. Said function can be alternatively be taken over also by the arrangement of partial switches if the control entry points of said partial switches [1:n] 15 are combined via logic elements in a way that the exit signal of control circuit 30 during normal charge/discharge operation of the protection circuit opens and closes at each case all partial switches [1:n] 15 at the same time.

The embodiment shown in FIG. 2 matches widely with the embodiment shown in FIG. 1. The essential difference between both embodiments is that, in case of an overvoltage detected, the low-ohmic circuit generated between the charge/discharge terminals 50, 60 does not run via load switch LS, fuse Fu and the LI-Ion cell 1 but between the charge/discharge terminals 50 and 60 an arrangement of short-circuit switches 20 is located comprising partial switches [1:n] 20. Said arrangement of short-circuit switches 20 is functionally equivalent to the arrangement of said partial switches [1:n] 15 shown in FIG. 1 and is monitored by a remaining voltage detector comprising the voltage comparator 26 and a reference voltage source 26.1. The voltage comparator 26 corresponds the voltage comparator 16 shown in FIG. 1. All other components of the circuit are the same as the components shown in FIG. 1. The description of the functions of the embodiment shown in FIG. 1 is valid for the embodiment of FIG. 2 as well.

Figure 3:
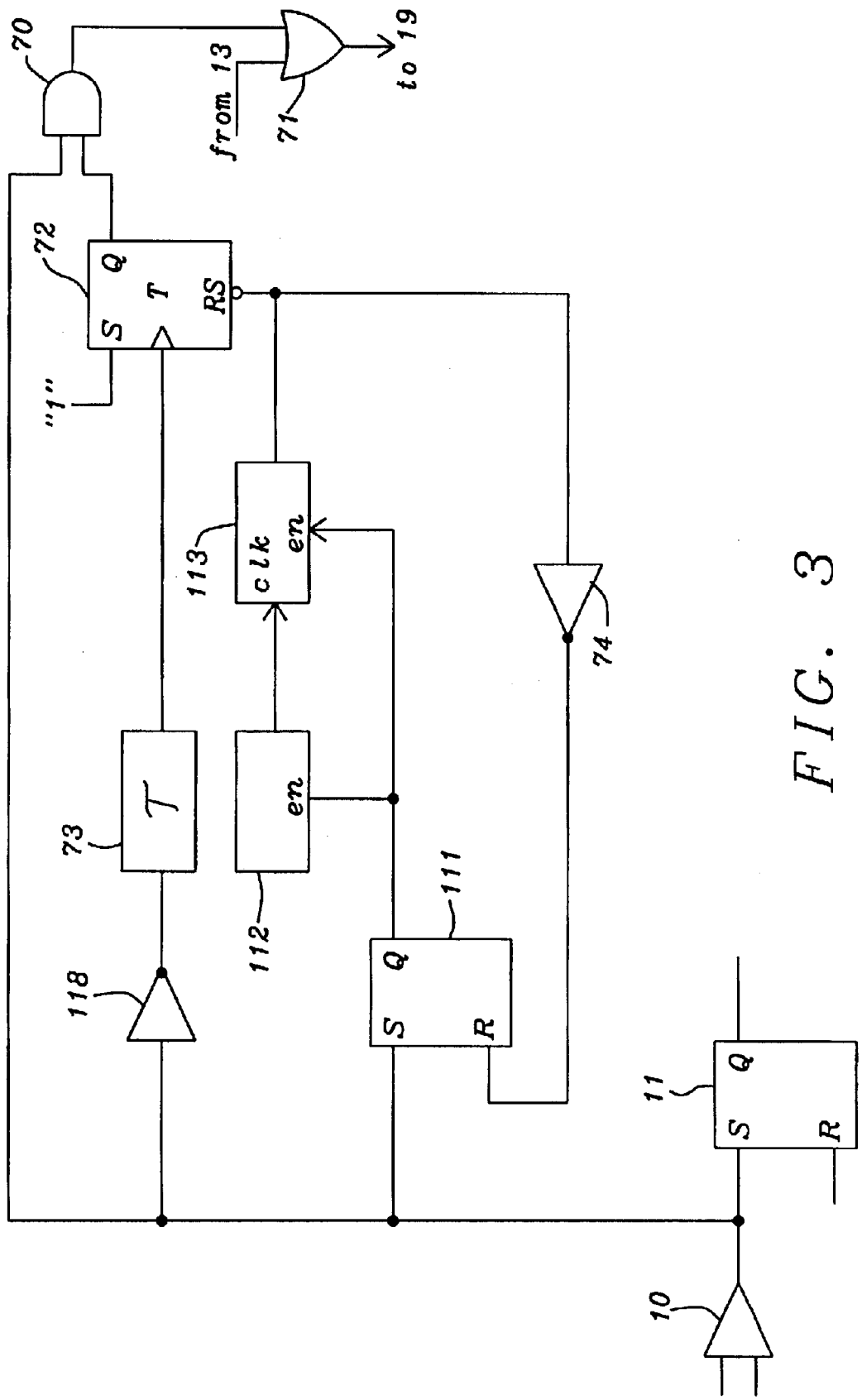
FIG. 3 shows an enhanced version of the first and second embodiment.

FIG. 3 shows a supplement of a circuit useable as well for the embodiment shown in FIG. 1 as for the embodiment shown in FIG. 2 enabling the recognition of multiple occurrences of overvoltage.

Hereunto is the overvoltage detector, that means the exit of comparator 10 in FIG. 1 and FIG. 2 not only connected to the entry S of the R/S flipflop 11 but is also connected to the entry S of an additional R/S flipflop 111, an inverter 118 and the first entry of an AND-element 70. The exit of said AND-element 70 is connected via an OR-element 71 to the control entry of the semiconductor switch 19 shown in FIG. 1 and FIG. 2. The second entry of the OR-element receives the exit signal of timer circuit 13 shown in FIG. 1 and FIG. 2.

The second entry of the AND-element 70 shown in FIG. 3 is connected to the exit Q of a data or D-flipflop 72, whose clock entry T is connected via a delay circuit 73 to the exit of the inverter 118. The exit Q of the second R/S-flipflop 111 is connected to the release entries "en" of clock generator 112 and of timing circuit 113. The exit of timing circuit 113 is connected as well to the R/S entry of the D-flipflop 72 as to the reset entry R of R/S flipflop 111 via inverter 74.

Said circuit functions as follows:

As soon as the overvoltage detector 10 detects an overvoltage and accordingly delivers the logical signal "1", the exit Q of R/S flipflop 111 is set to the logical value "1" and therewith starts clock generator 112 and timing circuit 113 via their release entries "en". The exit of timing circuit 113, whose predefined delay time could be e.g. 10 minutes, is set immediately to the logical value "1", so that, due to inverter 74, the entry R of R/S flipflop 111 gets the logical value "0", by what said R/S flipflop 111 gets prepared to be resetted. At the same time D-flipflop 72 is taken out of the reset actions. After the reduction of the overvoltage by means of the circuits according to FIG. 1 or FIG. 2 the exit signal of the overvoltage detector changes from "1" to "0". Said falling edge sets the D-flipflop 72 after the delay time τ of e.g. a few milliseconds generated by the delay element 73, so that the exit Q of said flipflop 72 is set to "1" and therewith the AND-element 70 switches for the next exit signal "1" of overvoltage detector 10, occurring within the delay time of the clock circuit 113, into a permeable state, whereupon the semiconductor switch 19 closes and, as described in the context of FIG. 1, disconnects the Li-Ion cell 1 permanently from the charge/discharge terminals 50 and 60.

In case there is no other occurrence of overvoltage during the delay time of timing circuit 113 the exit of said timing circuit 113 resets again to the logical value "0" whereby as well as the D-flipflop 72 as the R/S-flipflop 111 are reset to the initial state.

While the invention has been particularly shown and described with reference to the preferred embodiments thereof, it will be understood by those skilled in the art that various changes in form and details may be made without departing from the spirit and scope of the invention.

What is claimed is:

1. A charge/discharge protection circuit for a rechargeable battery, secured by a fuse, comprising a control circuit, which opens or closes a load switch, dependent on the magnitude of the voltage on the battery terminals, the voltage on the charge/discharge terminals of said protection circuit and on the magnitude of the charge/discharge current, thus characterized that a number of partial switches is located parallel to the load switch, that an overvoltage detector closes, in case of an overvoltage on charge/discharge terminals, all partial switches via a control logic, which afterwards cyclically progressing opens one partial switch after the other, that a voltage detector, monitoring the remaining voltage over the partial switches inhibits the opening of at that time next partial switch if the remaining voltage over the still closed partial switches is higher than a predefined limit of said remaining voltage, and that the control logic activates a permanent disconnection of the battery from the charge/discharge terminals if the cycle is not completed within a predefined time Interval, that means, if at least the last partial switch is still closed.

2. The circuit according to claim 1, wherein the exit said overvoltage detector is connected to the first entry of a AND-element, whose second entry is connected to the exit of a resettable memory circuit whose entry is also connected to the exit of overvoltage detector and said memory circuit sets, after the first occurrence of an overvoltage, said second entry of AND-element on "1" during predefined time interval which is longer than said cycle-time, therewith a next occurrence of overvoltage, happening during said predefined time interval, generates a "1" on the exit of AND-element and thereby activates a permanent disconnection of battery.

3. The circuit according to claim 1, wherein a control logic to disconnect permanently the battery comprises a controlled switch connected to one of the terminals of said battery via a fuse wherein said switch is being closed by said control logic if, within a defined time interval, at least the last partial switch is still closed.

4. The circuit according to claims 3, wherein said control logic comprises a timing circuit whose delay time is longer than the predefined time interval for the cyclical opening of all partial switches and which delivers a signal after said delay time, activating a permanent disconnection of the battery.

5. The circuit according to claim 4, wherein said control logic comprises a R/S flipflop to store the occurrence of a detected overvoltage, and that the exit of said R/S flipflop is connected to the release entries of timing circuit and of switching logic, receiving a clock signal and cyclically progressing delivers the control signals to open a partial switch one after the other, as long as on its other entry the exit signal of voltage detector is activated, which corresponds to a remaining voltage over the still closed partial switches being higher than the predefined limit of said remaining voltage.

6. The circuit according to claim 5, wherein said R/S flipflop receives on its reset entry point a reset signal which is derived from a signal controlling the last partial switch.

7. A charge/discharge protection circuit for a rechargeable battery, secured by a fuse, comprising a control circuit, which opens or closes a load switch, dependent on the magnitude of the voltage on the battery terminals, the voltage on the charge/discharge terminals of said protection circuit and on the magnitude of the charge/discharge current, thus characterized that an arrangement of short-circuit switches comprising parallel arranged partial switches is located parallel to the charge/discharge terminals, that an overvoltage detector closes, in case of an overvoltage on charge/discharge terminals, all partial switches via a control logic, which afterwards cyclically progressing opens one partial switch after the other, that a voltage detector, monitoring the remaining voltage over the partial switches inhibits the opening of at that time next partial switch if the remaining voltage over the still closed partial switches is higher than a predefined limit of said remaining voltage, and that the control logic activates a permanent disconnection of the battery from the charge/discharge terminals if the cycle is not completed within a predefined time interval, that means if at least the last partial switch is still closed.

8. The circuit according to claim 7, wherein the exit said overvoltage detector is connected to the first entry of a AND-element, whose second entry is connected to the exit of a resettable memory circuit whose entry is also connected to the exit of overvoltage detector and said memory circuit sets, after the first occurrence of an overvoltage, said second entry of AND-element on "1" during a predefined time interval which is longer than said cycle-time, therewith a next occurrence of overvoltage, happening during said predefined time interval, generates a "1" on the exit of AND-element and thereby activates a permanent disconnection of battery.

9. The circuit according to claim 7, wherein a control logic to disconnect permanently the battery comprises a controlled switch connected to one of the terminals of said battery via a fuse wherein said switch is being closed by said control logic if, within a defined time interval, at least the last partial switch is still closed.

10. The circuit according to claims 9, wherein said control logic comprises a timing circuit whose delay time is longer than the predefined time interval for the cyclical opening of all partial switches and which delivers a signal after said delay time, activating a permanent disconnection of the battery.

11. The circuit according to claim 10, wherein said control logic comprises a R/S flipflop to store the occurrence of a detected overvoltage, and that the exit of said R/S flipflop is connected to the release entries of timing circuit and of switching logic, receiving a clock signal and cyclically progressing delivers the control signals to open a partial switch one after the other, as long as on its other entry the exit signal of voltage detector is activated, which corresponds to a remaining voltage over the still closed partial switches being higher than the predefined limit of said remaining voltage.

12. The circuit according to claim 11, wherein said R/S flipflop receives on its reset entry point a reset signal which is derived from a signal controlling the last partial switch.

\* \* \* \* \*